US006228907B1

(12) United States Patent
Cummings et al.

(10) Patent No.: US 6,228,907 B1
(45) Date of Patent: *May 8, 2001

(54) IONIC EMULSION POLYMERS AND THEIR PREPARATION

(75) Inventors: Lowell O. Cummings, San Anselmo; Patrick A. Terrizzi; Norman A. Gac, both of San Francisco, all of CA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/490,993

(22) Filed: Jan. 26, 2000

Related U.S. Application Data

(63) Continuation of application No. 09/096,819, filed on Jun. 12, 1998, now Pat. No. 6,063,840, which is a continuation of application No. 08/604,370, filed on Feb. 21, 1996, now Pat. No. 5,766,768, which is a continuation of application No. 07/964,650, filed on Oct. 21, 1992, now abandoned.

(51) Int. Cl.$^7$ .............................. C08K 3/20; C08L 63/02
(52) U.S. Cl. ............................................ 523/420; 523/416
(58) Field of Search ...................................... 523/416, 420

(56) References Cited

U.S. PATENT DOCUMENTS

| 4,446,257 | 5/1984 | Kooijmans et al. | 523/403 |
| 4,588,617 | 5/1986 | Oka | 427/443 |
| 4,752,528 | 6/1988 | Oka | 428/403 |
| 5,252,637 | 10/1993 | Craun et al. | 523/406 |
| 5,441,996 | 8/1995 | Cummings et al. | 523/416 |
| 5,612,143 | 3/1997 | Cummings et al. | 428/626 |
| 6,063,840 | * 5/2000 | Cummings et al. | 523/416 |

OTHER PUBLICATIONS

Encyclopedia of Polymer Science and Engineering, vol. 6, pp 340–341 (1986).
Lee & Neville, Handbook of Epoxy Resins, McGraw–Hill p. 5–3 to 5–8 (1967).

* cited by examiner

*Primary Examiner*—Robert Dawson
*Assistant Examiner*—D. Aylward
(74) *Attorney, Agent, or Firm*—Michael Leach

(57) ABSTRACT

Two component water-based coatings, inks, adhesives and sealants prepared by reacting enhanced molecular weight epoxy emulsions with amine curatives.

25 Claims, 1 Drawing Sheet

IONIC EMULSION POLYMERS AND THEIR PREPARATION

"This application is a continuation of application Ser. No. 09/096,819 filed Jun. 12, 1998, U.S. Pat. No. 6,063,840 which is a continuation of application Ser. No. 08/604,370 filed Feb. 21, 1996, now U.S. Pat. No. 5,766,768, which is a continuation of application Ser. No. 07/964,650 filed Oct. 21, 1992, abandoned."

BACKGROUND OF THE INVENTION

The present invention relates generally to two component water-based coatings, inks, adhesives, and sealant compositions and, more particularly, to enhanced molecular weight epoxy emulsions for use in water-based coatings, inks, adhesives, and sealant compositions, and to methods for their manufacture. The present invention also relates to a novel method of curing such enhanced molecular weight epoxy emulsions, and to the novel cured epoxy resins produced thereby.

In one important embodiment, this invention relates to two component water-based "maintenance finishes". Maintenance finishes are water-based coatings which can be applied to previously coated surfaces, to cement and cement block, to plaster, to metals such as steel, and to any other surfaces which are commonly coated with conventional epoxy coatings.

In another important embodiment, this invention relates to two component solvent-free and near solvent-free air dry and heat cure coatings, inks, adhesives, and sealant compositions for application, for example, to metals, to wood, to non-woven as well as woven fabric, and to paper. These coatings, inks, adhesives, and sealant compositions may be used in factory fabrication and factory finishing of such end products as trucks, automobiles, coil aluminum and steel, containers, appliances, tools, doors, windows, siding, paneling, cabinets and shelving, garments, carpets, and such other end uses where appearance, hardness, toughness, chemical resistance, controlled rate of cure, and low VOC (volatile organic compounds) are particularly desirable.

In still another important embodiment, this invention relates to two component water-based coatings which can be applied to asphalt and concrete surfaces as a barrier and containment coating or as a safety marking material or traffic paint.

Environmental considerations have had a profound effect on the use and development of new coatings, inks, adhesives, and sealants, including the organic and inorganic binders which are widely used in them. In confined production lines, for example, electrodeposition, powder, and radiation-cure coatings, adhesives and sealants are increasingly being used to reduce or eliminate VOC concerns. However, large structure applications such as tanks, highways, food and chemical and heavy manufacturing plants cannot benefit from these technologies since they cannot be brought indoors to assembly lines, but rather must be painted in the field.

Two component curable compositions comprising epoxy polymers and polyamine curatives currently are the standard in the art.

The dominant technology in high performance maintenance coatings for such large structure applications is based upon amine cured epoxy coatings. The leader or so-called standard of performance coatings are solvent thinned solid epoxies cured with solvent thinned aminated dimer acids. There are, however, three major objections to such two component systems.

First, there is an objection to atmospheric solvent emissions. In order to dissolve the resins and to reduce the viscosity of formulated materials to application viscosity, large quantities of solvent are required, which may violate applicable emission requirements. Second, there are objections to organic solvents that are used as reducers and thinners, e.g., xylene, toluene, and glycol ethers, which are hazardous chemicals targeted for control or elimination because of their toxicity. Thus, the disclosure of low or no VOC water-borne epoxies to replace the current solvent-based epoxies will not only reduce atmospheric contamination by hundreds of millions of pounds of volatile organic compounds but will simultaneously eliminate the toxic chemical solvents. Third, there is an objection to the lengthy ingestion period and thus lost labor hours required after component mixing in using the current solvent-based epoxies.

Efforts have been made to equal the performance of solvent systems by emulsifying liquid epoxy resins or solvent-thinned solid resins and to cure them with emulsified or water-soluble amines. These efforts have met with limited success, at best, due to problems encountered on both the epoxy side and the amine side of such systems.

On the epoxy side, there are molecular weight and molecular configuration limitations. Solid epoxy resins in the molecular weight range of about 800 are necessary to achieve desired performance properties when amine cured coatings are prepared under ambient conditions, to achieve desired performance properties. Liquid resins with molecular weights in the range of about 390 and cured with similar amine technology simply will not yield the desired performance properties. Further, the molecular configuration is limited to relatively few commercially available epoxy resins such as bisphenol-epichlorohydrin condensates. Finally, currently available emulsified epoxies have stability problems.

The in situ polymerization and molecular enhancement of polyepoxide or diepoxide in water has not been disclosed in the context of coatings, inks, adhesives and sealants applied by brush, roll, spray, and electrodeposition as a viable alternative to the methods and compositions described.

There is very little information in the literature regarding reactions to increase the molecular weight of polyepoxides or diepoxides through homopolymerization or through the reaction between the oxirane and amine hydrogen, or still further through the reaction between the oxirane and ionic compounds such as those generated from sodium, potassium, ammonium hydroxide, etc. Chapter 5 of Lee and Nevil, entitled "Epoxy Resins", describes the many reaction potentials of the oxirane ring but does not discuss or explain possible ionic in situ polymerization.

On the polyamine side, there are a number of severe limitations to the in situ polymerization and molecular enhancement of polyepoxide or diepoxide in water. For example, in order to be water miscible with the water-borne epoxy, the polyamine must be either a water solution, a water emulsion, or a combination of the two. Those skilled in the art, however, recognize that it is extremely difficult to develop stable polyamine emulsions as a result of the very high viscosity of many water-soluble polyamines in the desired molecular weight range.

In the field application of maintenance finishes, the mixed components must be workable for a minimum of four hours and preferably eight hours. Yet, the mixed materials, upon evaporation or removal of water, must cure rapidly.

SUMMARY

The composition of the present invention comprises two components, designated Part A and Part B, and their combination. When mixed, these two components form end products usable as coatings, inks, adhesives and sealants. Part A is an enhanced molecular weight water-borne epoxy polymer and Part B is a primary, secondary or tertiary amine. In addition, in order to optimize the application, cure, or physical properties of the end product, either or both Part A and Part B can be modified with pigments or other particulate matter, reactive or non-reactive resins and polymers, wetting agents, solvents, pigment grinding aids, or flow control agents.

Accordingly, it is an object of the present invention to provide stable enhanced molecular weight epoxy water-borne ionic emulsion polymers.

It is another object of the invention to provide enhanced molecular configuration epoxy water-borne ionic emulsion polymers.

It is still a further object of the invention to provide two component water-based coatings, adhesives, and sealant compositions with little or no VOC.

Yet another object of the invention to provide two component water-based coatings, adhesives, and sealant compositions with low or no toxic or hazardous organic solvents and paint thinners.

It is yet another object of the invention to provide odor-free two component amine cured water-based epoxy systems that cure at room temperature.

These and other objects of the present invention together with the various advantages thereof will become apparent to those skilled in the art from the detailed disclosure of the present invention as set forth below.

DESCRIPTION OF THE INVENTION

PART A

Part A comprises a mixture of an epoxy ionic emulsion which may be combined with other components, as described below, to optimize the application, cure, or physical properties of the end product.

In preparing the epoxy ionic emulsion, first an oxirane (or epoxy containing) liquid resin is dispersed in water with the aid of a wetting agent to form an oil-in-water emulsion. This emulsion may be prepared using any suitable method such as that described in U.S. Pat. No. 3,669,900 in diameter. The average resin particle size will lie in the range of about 0.1 to 5 microns in diameter and preferably will be about one micron in diameter.

The water-borne resin particles are then reacted with amine derivatives, or other bases such as polyamines, sodium hydroxide, potassium hydroxide. In the presence of excess water, these amine derivatives are ionic compounds of the general formula:

where R is a hydrogen or an organic group.

It is believed that the epoxy resin in this second step is in the form of finely divided resin spheres' suspended in water and that the $[HNR_3]^+[OH]^-$ ionic compounds cause the resin particles each to polymerize as a resin sphere, preferably having, on average, a diameter of about one micron. Surprisingly, these spheres do not change significantly in size, either during the emulsion polymerization, or afterwards.

The molecular enhancement with the formation of a homopolymer, or homopolymerization, is believed to initiate with the species having the approximate structure as follows:

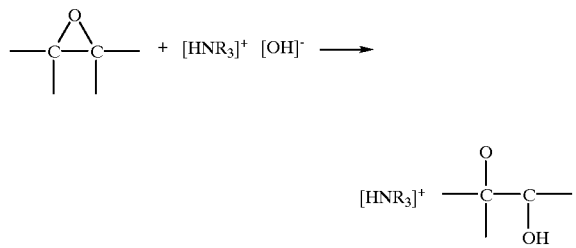

where R is hydrogen or an organic group.

For illustrative purposes, the overall polymerization reaction of a diepoxide forming a homopolymer is depicted as follows:

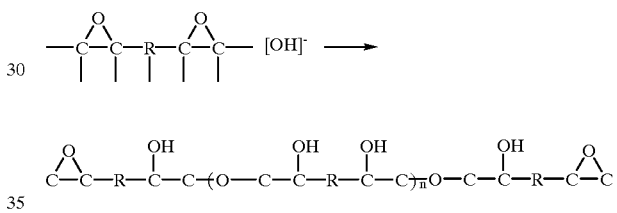

where R is a divalent organic radical.

In all likelihood, as is shown in the following, there is a much smaller but competing reaction when amines are employed as the generator/contributor of the $[OH]^-$ group:

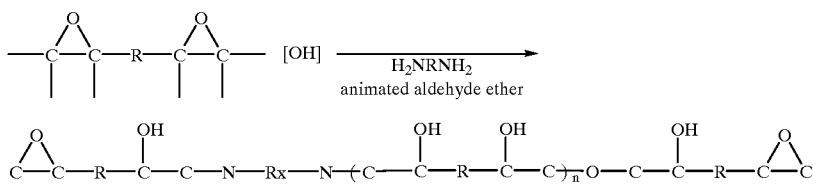
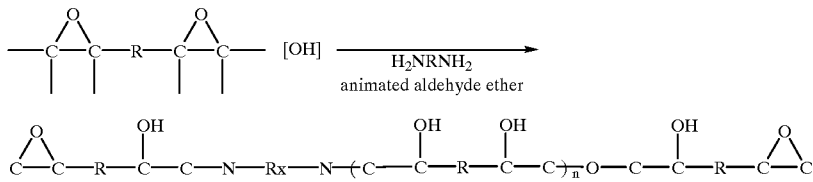

where R is a divalent organic radical and Rx is urea formaldehyde core, as discussed below.

The pH of the emulsion, upon addition of the base and during the polymerization should initially be in the range of about 9 to 14 and preferably about 10 to 13.0. After an initial exotherm, the pH begins dropping and emulsion polymerization proceeds under controlled conditions until the reaction is stopped. Polymerization may be stopped at any point by bringing the pH to below about 7, thus rendering the reacting species too weak to continue to propagate. By this method, one can tailor the molecular weight to the desired properties of the end polymer.

BRIEF DESCRIPTION OF THE DRAWING

This is shown pictorially in FIG. 1 which is a graph of Molecular Weight/Reaction Time/Film Properties in which the x-axis shows linearly advancing time (units dependent on reactants and reaction parameters) and the y-axis shows linearly advancing polymerization to the formation of a powder at the y-axis value of "1".

The dispersed polymer particles can be formed into continuous hardened films by spreading the final emulsion into a thin layer and allowing the water to evaporate. As a matter of proof of reaction, if the epoxy emulsion with no added base were spread out side-by-side with the present ionic emulsion material, the dramatic change in film clarity and tack would be noted.

Figure 1:
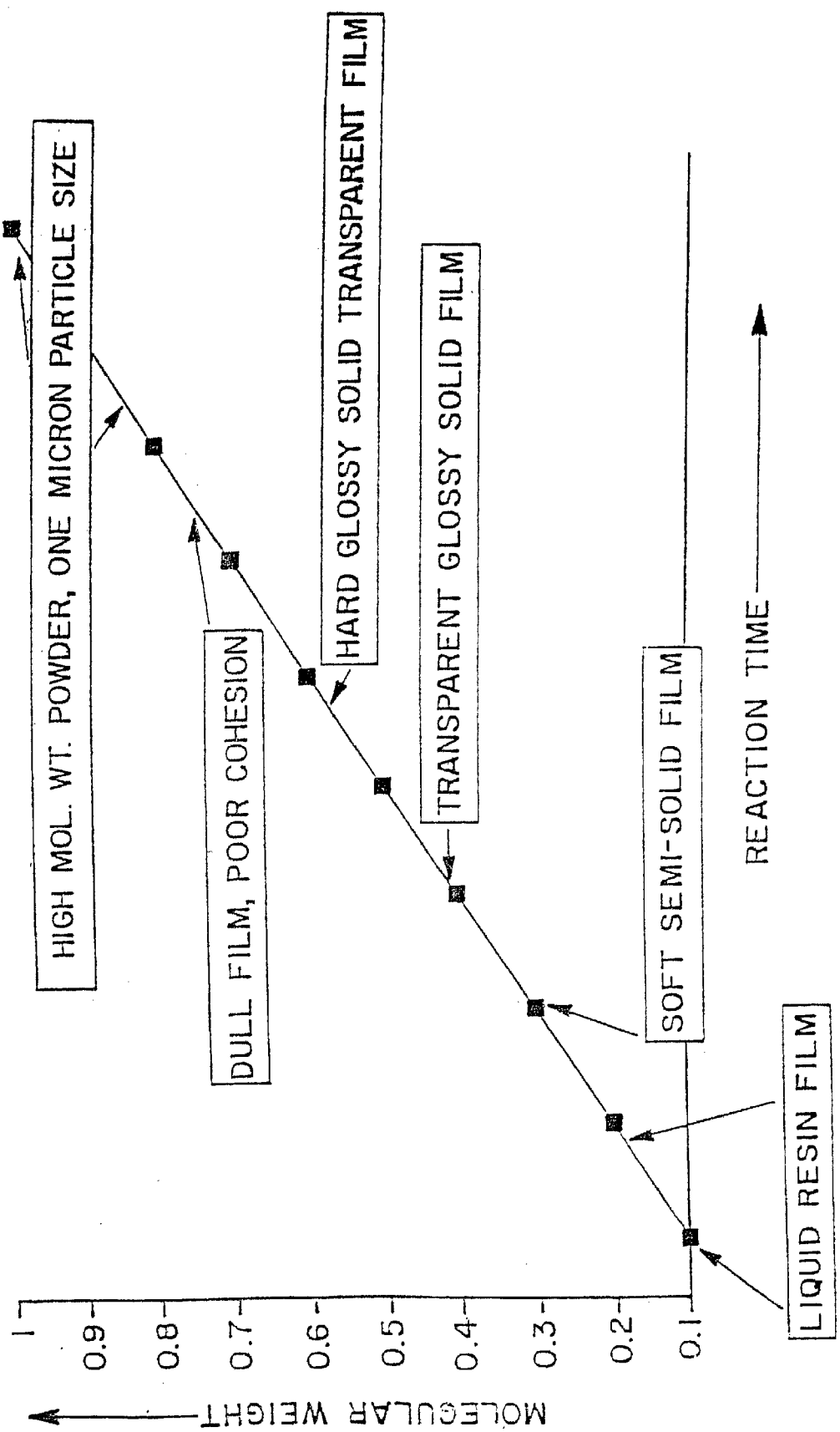

The variables in the preparation of suitable ionic epoxy emulsions are choice of (1) epoxy, (2) wetting agents, (3) chemical base, (4) neutralizing acid, (5) emulsion solids concentration (6) emulsion particle size, and (7) reaction time and temperature.

The liquid epoxy resin which is the starting point in the preparation of these ionic polymers may vary considerably in chemical structure. The simplest liquid epoxy resin which can be used in the practice of this invention will be free of functional groups other than epoxide or epoxide and hydroxyl groups and will contain at least 3 carbon atoms as illustrated by 1,2-epoxy propane. More complex liquid epoxy resins which can be used in the practice of the invention include, for example, polyglycidyl ethers of bisphenol or saturated bisphenol, polyether derivatives of polyhydric phenols containing epoxide groups, and epoxy containing vinyl polymers in solution or latex form. Those skilled in epoxy technology will be able to choose the epoxy resin from any of the myriad well-known epoxy resins.

Other useful epoxy-containing resins include higher molecular weight materials which may be solids at room temperature. While such higher molecular weight materials are more difficult to emulsify in water, they may nevertheless be rendered suitable for use in the practice of the present invention through proper formulation with solvent and heat.

Three examples of specific liquid polyepoxides which may be used in the practice of this invention include: diglycidyl ether of bis(4-hydroxyphenol)methane (also known as diglycidyl ether of Bisphenol F), diglycidyl ether of 2,2'-bis(4-hydroxyphenol) propane (also known as diglycidyl ether of Bisphenol A), and aminated aldehyde ether chain-extended epoxies.

Aminated aldehyde ether extended diglycidyl ether of Bisphenol A
where Rx is an organic group.

In a preferred embodiment, the epoxy material is a diepoxide and is the condensation product of epichlorohydrin and bisphenol A with a molecular weight of 380 or weight per epoxy ("WPE") of 190, and a viscosity of 10,000 to 20,000 cps.

A wetting agent or combination of wetting agents must be used in forming the ionic epoxy emulsion, preferably at a level of about 0.1 to 10% by weight and most preferably at a level of about 5% by weight. The wetting agent(s) should be stable over a pH range of about 3 to 14. The wetting agents serve several functions, namely: to enable the formation and the continued stability of the initial emulsion, to enable preparation of the desired particle size emulsion, to maintain emulsion integrity in mixing Part A with Part B, and to assist the flow-out in the formation of the final film. Whereas there are many materials which could function at varying concentrations to meet these requirements, the wetting agents chosen should have an HLB above about 15. CapCure 65, a non-ionic wetting agent which is believed to be a stearic acid ester of polyethylene glycol having an HLB of about 18 is one preferred wetting agent when used at 5% solids by weight based upon epoxy solids. In a particularly preferred embodiment, the CapCure 65 is used together with 0.2% by weight, based on solids, of a polyethyleneoxide fluorochemical sulfamide non-ionic wetting agent available from 3M as FLUORAD FC-170-C, to greatly enhance leveling and minimize pinholes in the final film.

The reaction rate, viscosity of the emulsion, and film characteristics are heavily influenced by three variables: emulsion solids concentration, emulsion particle size, and reaction time and temperature. The amount of water that must be present for ionic polymerization to take place must substantially exceed the quantity of water necessary to completely form the base or amine hydrate Thus, the preferred range of solids varies from about 5 to 90 percent by weight based on the weight of the emulsion and preferably ranges from about 40% to 85%. It is believed that average particle sizes as low as 0.1 micron will yield the desired molecular enhancement and further that average particle sizes as high as 5 microns or more can be employed. The preferred average particle size, however, is one micron.

(V)

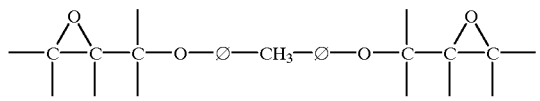

Diglycidyl ether of Bisphenol F.

(VI)

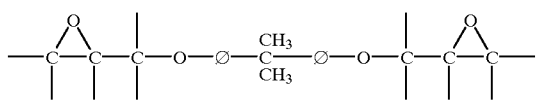

Diglycidyl ether of Bisphenol A.
∅ is a phenylene group.

(VII)

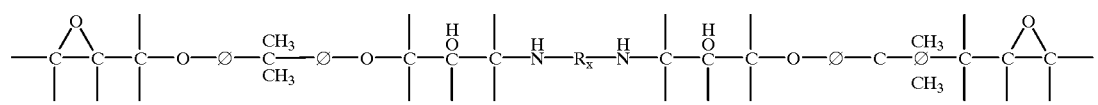

Finally, as to time and temperature, as those skilled in the art will recognize, time and temperature dynamics vary for each specific epoxy and each specific amine or base employed in catalyzing the reaction and will have to be optimized on a case-by-case basis.

Additionally, it is noted that-a high rate of polymerization at low temperatures is a characteristic of ionic polymerization, and the more basic the ion, the better it serves to initiate chains. Thus, by varying the [OH—] activity and concentration by way of using different types and concentrations of mineral bases and polyamines, variations in final film properties occur. Useful polymers can be made with potassium hydroxide, sodium hydroxide and other mineral bases which produce a pH in excess of about 9.0.

In one embodiment of this invention, film properties may be optimized through polyamine choice in both the Part A polymerization step as well as in Part B, prior to mixing the components and forming a film. Generally, the polyamine should be a chosen from the group consisting of primary or secondary amines. In fact, while any amine could be used, the amines discussed below in connection with Part B are presently preferred for use in Part B as well as in the polymerization step of Part A.

In one particularly preferred embodiment of the invention, the polyamine is a "non-gel" reaction product prepared by reacting one and one half moles of hexamethylene diamine, one half mole of a polyoxypropylene diamine, and one mole of N,N'-bis(methoxymethyl) uron, as described by one of the present inventors in his U.S. Pat. Nos. 4,490,510, 4,574,145, and 4,659,787.

As noted earlier, polymerization may be stopped at any point by bringing the pH to below about 7, rendering the reacting species too weak to continue to propagate. This is done by adding acid. Sulfuric, phosphoric, formic, acetic, and lactic acids, among others, are effective to halt polymerization when used at stoichiometric ratios of at least one equivalent per active [OH]$^-$ or amine hydrogen and preferably at a 1:2 or higher stoichiometric equivalent level.

Although it is preferred that the two component system be made up of Part A epoxy component and Part B curative component, Part A may be modified to optimize certain characteristics of the end product such as intercoat adhesion, flexibility, chemical resistance, surface feel, and mar resistance. Such modification incorporates other water-dispersible coating materials in Part A and/or Part B of the composition. Such modifiers include synthetic latexes, alkyds, low molecular weight resin emulsions, epoxy ester emulsions, cationic and non-ionic asphalt emulsions, waxes and wax-like materials.

Typical useful synthetic latexes include the numerous latexes used in paints, inks, adhesive materials and sealants, such as polyvinyl acetate latexes, vinyl acrylic latexes, acrylic latexes, styrene-acrylic latexes and styrene-butadiene latexes.

Useful low molecular weight resin emulsions may be made from any water-dispersible polymer or copolymer resin of molecular weight under about 5000. For example, low molecular weight polyethylene wax-like materials which are emulsifiable in water can be used, such as Allied Signal Corporation's AC-6, a homopolymer of polyethylene with a molecular weight of about 2000 and AC 540, a polyethylene/acrylic acid copolymer with a molecular weight of about 3200.

PART B

Part B comprises a mixture of amines or polyamines in water solutions, or as emulsions, along with other components as described below.

The amines may be chosen from among primary, secondary and tertiary amines and further may be monoamine, diamine, triamine, and tetramine structures. The simplest is ammonia. Other illustrative examples include monoethanol amine, hexamethylene diamine, commercial isomers of hexamethylene diamine, trimethyl hexamethylene diamine, N-aminoethyl piperazine, 1,5 aminomethyl pentane diamine, isophorone diamine, 1,2-diamine cyclohexane, xylene diamine, oleyl diamine, methylene dianiline, 2,4 bis(p-amino benzyl)analine, polyoxypropylene diamines and triamines available from Texaco Chemical under the trademark Jeffamine. Fatty amine diamines and triamines available from Sherex Corp. under the trademark Adogen, diethylene triamine and triethylene tetramine may also be used.

Part B may comprise the non-gel reaction product of (I) aldehyde ether monomer, with (II) an amine or a polyamine or polyamines chosen from the group consisting of primary, secondary and tertiary amines. The structure and synthesis of preferred aminated urea formaldehyde ether monomers from this group, described in part in U.S. Pat. Nos. 4,490, 510, 4,574,145, and 4,659,787, includes the reaction product of aminated aldehyde ether, hexamethylene diamine and urea formaldehyde (U.S. Pat. No. 4,490,510, Example 10 in Table 1) and the reaction product of aminated aldehyde ether, hexamethylene diamine and Jeffamine D400 reacted with urea formaldehyde (U.S. Pat. No. 4,490,510, Example 11 in Table 1). Other preferred polyamine curing agents include the "non-gel" reaction products prepared by reacting one and one half moles of hexamethylene diamine, one half mole of a polyoxypropylene diamine, and one mole of N,N'-bis(methoxymethyl) uron.

Aqueous emulsions of water-insoluble amines can also serve as the Part B curative. Specific amine adduct which are the reaction product of a liquid epoxy resin, such as Epon 828 (condensation product of epichlorohydrin and 2, 2' paraphenoxypropane also (known as "bisphenol A")), and a fatty diamine such as tridecyl propyl ether diamine, are particularly suitable as curing agents. It has been found that certain water solutions of amines cause polymerization faster than others. These are water solutions of amines that have a pH value of at least about 12.5. Typical of these is hexamethylene diamine isomers and derivatives of hexamethylene diamine in the form of aminated aldehyde ethers such as 2-methyl pentamethylene diamine.

When Part B is then combined with Part A, the active amine hydrogen introduced in B at the new higher pH initiates a new epoxy/amine reaction. It is presently believed that because of the neutralized ions in A, the reaction proceeds slowly yielding a pot-life of some hours. However, when the material is spread into a thin coating or water is removed as in evaporation from a thin film, the [HNR$_3$]$^+$ [OH]$^-$ change to NR$_3$ H$_2$O and the NR$_3$ reacts with the epoxide in the conventional oxirane ring opening/amine reaction mechanism.

This has great practical value since the mix of polymerized epoxy emulsion existing in the water solution of [HNR$_3$]$^+$[OH]$^-$ reacts at a slow and reasonably controlled rate when still in the water phase, but the water-free films from this mix cure in a short time as the NR$_3$ is reformed. The NR$_3$, as such, is a very strong epoxy curative. Thus, the system has a long pot-life as a mixed emulsion but cures quickly as a water-free film.

The following examples are intended to illustrate the practice of the present invention. These examples are not intended to be exhaustive or limiting of the invention.

EXAMPLES

1. PREPARATION OF COMPONENT A

Step 1: Prepare Epoxy Emulsion

Liquid epoxy resin (Epon 828) was emulsified using a planetary beater (Hobart mixer) as described in U.S. Pat. No. 3,669,900. This produced an oil-in-water emulsion with a resin content of 85–90% solids and the balance a non-ionic emulsifier-water mix. More particularly, into a 3 quart Hobart mixing bowl there were added 1000 grams of Epon 828, 154 grams of Capcure 65, and 4 grams of 3M fluorocarbon wetting agent FC-170-C. The mixture was beaten at high speed until a uniform thixotropic cloudy mass was formed. Then, 200 grams of water were set aside.

100 grams of the set aside water were then added to the thixotropic mass which was then beaten to generate an oil-in-water "mayonnaise-like" emulsion. In order to confirm that an oil-in-water emulsion was formed, a very small piece of this "mayonnaise" was added to 100 cc. of water. If it dispersed, the formation of an emulsion was confirmed; if it separated and floated, an emulsion was not formed.

If 100 grams of water failed to achieve the emulsion, an additional 50 grams of water were added and beat in and the product tested again. In the unlikely event that a total of 150 grams of water did not produce the desired emulsion, an additional 50 grams of water were added and the procedure repeated.

Once the oil-in-water emulsion was achieved, any remaining water of the original 200 grams were added followed by an additional 1000 grams of Epon 828. This mixture was beaten at high speed and emulsion particle size checked by examining a sample of very dilute emulsion on a microscope slide, i.e., set up a slide+sample+glass cover plate, using a 400×microscope with an eyepiece scale showing 2 microns per division.

When the desired average particle distribution of one micron was achieved, the emulsion was diluted with water to the desired level of epoxy resin solids.

Step 2: Polymerize Epoxy Emulsion 3040 grams of 50% solids Epon 828 emulsion prepared as described above were placed into a two gallon plastic pail. The 3040 grams of emulsion had 1520/190 or 8 equivalents of epoxide since an epoxide equivalent/amine hydrogen equivalent of 16/1 was desired for this reaction. Then, 0.5 equivalents of amine hydrogen (as a water solution of the Example 2 aminated aldehyde ether, with an amine hydrogen equivalent of 50) was added while stirring. The aminated aldehyde ether was the reaction product of 4 moles of hexamethylene diamine with one mole of N,N' bis (methoxymethyl) uron.

Immediately upon initiating the addition of the amine, the pH of the system increased from about 7.0 to about 13; no change in emulsion properties, viscosity, or emulsion particle size was noticed. Polymerization was allowed to proceed until the desired polymer/film property/molecular weight or "end point" to achieve a hard, glossy, solid transparent film was achieved, after which the polymer emulsion mass was neutralized with acid. The time of reaction was about three hours at about 60° C.

Step 3: Polymer End Point Determination

FIG. I was used to determine the point in time at which the emulsion mass was to be neutralized with acid to stop the reaction. Small samples of the mass were taken at time intervals and drawn down on black, sealed hiding chart paper to observe the progress in polymerization to the desired molecular weight/film properties.

| TIME (minutes) | OBSERVATION |
|---|---|
| Start | Very liquid resinous film |
| Start + 1 | Liquid film, |
| Start + 2 | Soft semi-solid film, |
| Start + 3 | Transparent, glossy, tacky film, |
| Start + 4 | Transparent, glossy, solid-(slight tack) film |
| Start + 5 | Hard, glossy, solid, transparent film, |
| Start + 6 | Hard, glossy, solid, translucent film, |
| Start + 7 | Dull film, poor cohesion, |
| Start + 8 | Powder, when heated will fuse to glossy solid, and |
| Start + 9 | High mol. weight powder, one micron avg. particle |

For optimum performance of the final product, it was observed that the acid should be added, under agitation, at Start+5, i.e., just as the film was about to become tack-free.

Step 4: Acid Neutralization

The reaction was stopped when the pH was reduced below 7. Phosphoric acid was added in amounts equal to 1/1 to 2/1 equivalents per amine hydrogen equivalent to bring the pH to 2.8. This required 81.6 gm. of 20% $H_3PO_4$ per 3,100 grams of emulsion. Upon aging, the emulsion drifted up in pH to 7 and higher, although the more stable materials were achieved at or near pH 7.

This completes the preparation of Component A.

2. PREPARATION OF COMPONENT B

An aminated aldehyde ether was prepared by mixing four moles of a 70° water solution of hexamethylene diamine and one mole of N,N' bis (methoxymethyl) uron. After a mild exotherm and completion of the reaction, the evolved methanol was stripped off leaving a water solution of the newly-formed polyamine. The solids were adjusted to 50% with water.

3. PREPARATION OF COMPONENT A

An ionic epoxy emulsion was prepared as per Step 1 of Example 1. The polymerization step was precisely the same as that of Step 2 of Example 1, except the 16/1 stoichiometric ratio of epoxide equivalent/amine hydrogen equivalents was carried out with a different aminated aldehyde ether. The polyamine of Example 4 was used for the polymerization step. The neutralization of this ionic emulsion was through the use of formic acid at 1:1 stoichiometric equivalency based on the total amine hydrogen of the Example 4 aminated aldehyde ether polyamine.

4. PREPARATION OF COMPONENT B

Aminated aldehyde ether was prepared by mixing one and one half moles of a 70% water solution of hexamethylene diamine, one half mole of a polyoxypropylene diamine, Jeffamine D400, and one mole of N,N' bis(methoxymethyl) uron. After a mile exotherm and completion of the reaction, the evolved methanol was stripped off leaving a water solution of the newly form polyamine. The solids were adjusted to 50% with water.

5. PREPARATION OF COMPONENT A

An ionic epoxy emulsion was prepared as per Step 1 of Example 1. The polymerization step was precisely the same as that of Step 2, Example 1 except that the 16/1 stoichiometric ratio of epoxide equivalent/amine hydrogen equivalents was carried out with a different amine, specifically hexamethylene diamine. The neutralization of this ionic emulsion was through the use of formic acid at 1:1 stoichiometric equivalency on the total amine hydrogen of the hexamethylene diamine.

6. COMPONENT B

Hexamethylene Diamine, 70% solution in water.

7. COMPONENT A

Dytek A, du Pont trademark for 2-methyl pentamethylene diamine isomer of hexamethylene diamine).

8. PREPARATION OF COMPONENT B

An Adogen 583, fatty amine, epoxy adduct was prepared by reacting a 60:40 ratio of fatty amine with Araldite 6010. After digestion for 24 hours, a 50% solids emulsion of this material was prepared using the procedure and technique described in Example 1., Step #1. Independently, a 50% solids emulsion of Araldite 6010 was prepared using the same procedure/technique. These two emulsions were then blended at a ratio 5:1, (5 parts of the Adogen 583/Araldite 6010 emulsion to one part of Araldite 6010 emulsion), and allowed to digest for 24 hours.

This amine rich adduct may be used as an epoxy curative.

9. MIXED COMPONENT A/B SYSTEM: CLEAR TWO COMPONENT WATER-BORNE EPOXY COATING 10 parts of a 50% solids epoxy ionic emulsion of Example 3-Component A mixed with 1 parts of polyamine curative of Example 4-Component B were mixed and the material sprayed on a clean steel and steel treated with the Bonderite 1000 process panels to achieve an approximately 1.5 mil dry film. It was noted that the material was colorless and odorless; further, no solvents or other volatile organic materials were added.

Flow and leveling were good. The water was allowed to evaporate from the film at room temperature and the panels were aged for 10 days prior to further testing. There is no sign of flash rusting.

Observations in evaluation of the films after aging: pencil hardness of 2H, no cracking on double bend, in excess of 50 methyl ethyl ketone rub resistance. This sample illustrates the excellent combination of hardness, flexibility and solvent-chemical resistance that is typical of these systems.

10. MIXED COMPONENT A/B SYSTEM: CLEAR TWO COMPONENT WATER-BORNE EPOXY COATING 40 part of 50% solids epoxy ionic emulsion of Example 1-component A were mixed with 5 parts of polyamine curative of Example 2-Component B are mixed and split into two different container. One material immediately sprayed and brushed on a clean steel test panels to achieve approximately a 1.5 mil dry film. It was noted that the material was colorless and odorless; further, no solvents or other volatile organic materials were added. Three hours later, the other half of the wet sample was applied on identical panels, prepared in an identical fashion so as to evaluate the pot life or field application stability time.

Flow and leveling were good. On half of the panels, the water was allowed to evaporate from the film at room temperature and the other half force-dried at 50° C. for 30 minutes. There was no sign of flash rusting.

Observations in evaluation of the films after aging for two days include: there were no observable differences in the film properties between the aged vs. un-aged pot life panels, pencil hardness of 2H, no cracking on double bend, in excess of 50 methyl ethyl ketone rub resistance. This sample illustrates the excellent combination of hardness, flexibility and solvent-chemical resistance that is typical of these systems. In addition, the pot life needed for application several hours after mixing was verified.

11. MIXED COMPONENT A/B SYSTEM: CLEAR TWO COMPONENT WATER-BORNE EPOXY COATING 10 parts of a 50% solids epoxy ionic emulsion of Example 5-Component A is mixed with 1 parts of polyamine curative of Example 2-Component B and sprayed on a clean steel to achieve an approximately 1.5 mil dry film. As with previous materials, this sample was colorless and odorless; further, no solvents or other volatile organic materials were added.

The results of the performance evaluations are shown in Table I, following Example 14.

12. MIXED COMPONENT A/B SYSTEM: CLEAR TWO COMPONENT WATER-BORNE EPOXY COATING 8 parts of a 50% solids epoxy ionic emulsion of Example 5-Component A were mixed with 1 part of polyamine curative of Example 4-Component B and sprayed on a clean steel to achieve an approximately 1.5 mil dry film. As with previous materials, this sample is colorless and odorless; further no solvents or other volatile organic materials were added.

The results of the performance evaluations are shown in Table I, following Example 14.

13. MIXED COMPONENT A/B SYSTEM: CLEAR TWO COMPONENT WATER-BORNE EPOXY COATING 10 parts of a 50% solids epoxy ionic emulsion of Example 5-Component A was mixed with 1 part of polyamine curative of Example 6-Component B and sprayed on a clean steel to achieve an approximately 1.5 mil dry film. As with previous materials, this sample was colorless and odorless; further no solvents or other volatile organic materials were added.

The results of the performance evaluations are shown in Table I, following Example 14.

14. MIXED COMPONENT A/B SYSTEM CLEAR TWO COMPONENT WATER-BORNE EPOXY COATING 3 parts of a 50% solids epoxy ionic emulsion of Example 7-Component A was mixed with 1 part of polyamine curative of Example 8-Component B and sprayed on a clean steel to achieve an approximately 1.5 mil dry film. As with previous materials, this sample was colorless and odorless; further no solvents or other volatile organic materials were added.

The results of the performance evaluations are shown in Table I, BELOW.

TABLE I

Wet Sample and Film Evaluation of Examples 11, 12, 13, and 14

| Example | Hardness | Flexi-bility | Gloss | Adhesion | Time elapsed after mixing that emulsion continues to yield satisfactory films |
|---------|----------|--------------|-------|----------|---|
| 11. | 8 | 9 | 9 | 6 | 4 hours |
| 12. | 7 | 10 | 10 | 7 | 6 hours |
| 13. | 10 | 3 | 7 | 5 steel | 2 hours |
| 14. | 5 | 9 | 7 | 9 steel 9 alum. | 3 Hours |

Rating: 10 Best
1 Poorest

While the present invention is described above in connection with preferred or illustrative embodiments, these embodiments are not intended to be exhaustive or limiting of the invention.

Rather, the invention is intended to cover all alternatives, modifications and equivalents which may be included within it spirit and scope, as defined by the appended claims.

What we claim is:

1. A method of preparing an epoxy polymer emulsion comprising dispersing liquid epoxy resin in water with the aid of a wetting agent to form an oil-in-water emulsion of epoxy resin particles and homopolymerizing the water-borne epoxy resin particles.

2. The method of claim 1 in which the homopolymerization is performed in the presence of an alkaline substance at a pH of 9 to 14.

3. The method of claim 2 further comprising the step of adding sufficient acid to adjust the pH of the polymerization reaction mixture to below about 7 when the desired molecular weight or polymer properties have been attained thereby halting the polymerization of the epoxy resin.

4. The method of claim 1 in which the epoxy resin particles have an average resin particle size ranging from 0.1 to 5 microns in diameter.

5. The method of claim 1 in which the average resin particle size is about 1 micron in diameter.

6. The method of claim 2 in which the alkaline substance is ammonia, an amine, an amine derivative, a polyamine, sodium hydroxide, or potassium hydroxide.

7. The method of claim 2 in which the alkaline substance is ammonia, primary amine, secondary amine, or tertiary amine which amines may be monoamine, diamine, triamine, or tetramine structures.

8. The method of claim 2 in which the epoxy resin is free of functional groups other than epoxide and hydroxyl groups and contains at least 3 carbon atoms.

9. The method of claim 1 in which the epoxy resin is selected from the group consisting of diglycidyl ether of bisphenol A, diglycidyl ether of saturated bisphenol A, diglycidyl ether of bisphenol F, a polyether derivative of a polyhydric phenol containing epoxide groups and mixtures thereof.

10. The method of claim 2 in which the alkaline substance is an amine catalyzing the homopolymerization.

11. The method of claim 10 in which the epoxy resin comprises the diglycidyl ether of bisphenol A.

12. The method of claim 1 in which the epoxy polymer emulsion is substantially free of organic solvent.

13. A method of preparing an epoxy polymer emulsion comprising dispersing liquid epoxy resin in water with the aid of a wetting agent to form an emulsion of epoxy resin particles in water and reacting the water-borne epoxy resin particles with each other in the presence of an alkaline substance at a pH of 9 to 14 to form a polymer comprising homopolymerized epoxy resin units.

14. The method of claim 13 further comprising the step of adding sufficient acid to adjust the pH of the polymerization reaction mixture to below about 7 when the desired molecular weight or film properties have been attained thereby halting the polymerization of the epoxy resin.

15. The method of claim 14 in which the epoxy resin particles have an average resin particle size ranging from 0.1 to 5 microns in diameter.

16. The method of claim 14 in which the average resin particle size is about 1 micron in diameter.

17. The method of claim 15 in which the alkaline substance is ammonia, an amine, an amine derivative, a polyamine, sodium hydroxide, or potassium hydroxide.

18. The method of claim 15 in which the alkaline substance is ammonia, primary amine, secondary amine, or tertiary amine which amines may be monoamine, diamine, triamine, or tetramine structures.

19. The method of claim 15 in which the epoxy resin is free of functional groups other than epoxide and hydroxyl groups and contains at least 3 carbon atoms.

20. The method of claim 15 in which the epoxy resin is selected from the group consisting of diglycidyl ether of bisphenol A, diglycidyl ether of saturated bisphenol A, diglycidyl ether of bisphenol F, a polyether derivative of a polyhydric phenol containing epoxide groups and mixtures thereof.

21. The method of claim 15 in which the alkaline substance is an amine catalyzing the homopolymerization.

22. The method of claim 21 in which the epoxy resin comprises the diglycidyl ether of bisphenol A.

23. An aqueous composition comprising a water borne dispersion of an enhanced molecular weight epoxy polymer comprising homopolymerized epoxy resin molecules, which epoxy resin molecules are free of functional groups other than epoxide and hydroxyl groups and contain at least 3 carbon atoms.

24. The aqueous composition of claim 23 in which the epoxy resin is selected from the group consisting of diglycidyl ether of bisphenol A, diglycidyl ether of saturated bisphenol A, diglycidyl ether of bisphenol F and a polyether derivative of a polyhydric phenol containing epoxide groups.

25. A heat hardening or air drying water-based composition suitable for use as a coating, ink, adhesive, or sealant comprising:

the reaction product of a mixture of Part A and Part B components;

the Part A component comprising an enhanced molecular weight epoxy polymer emulsion; and, the Part B component comprising an amine chosen from the group consisting of primary, secondary, and tertiary amines, wherein the Part A component comprises an epoxy polymer prepared by the method of claim 1.

* * * * *